Dec. 1, 1970 TAKEO MIURA ET AL 3,544,833
ANIMATABLE PICTURE-IMAGE REPRESENTING SYSTEM
Filed June 22, 1967 5 Sheets-Sheet 1
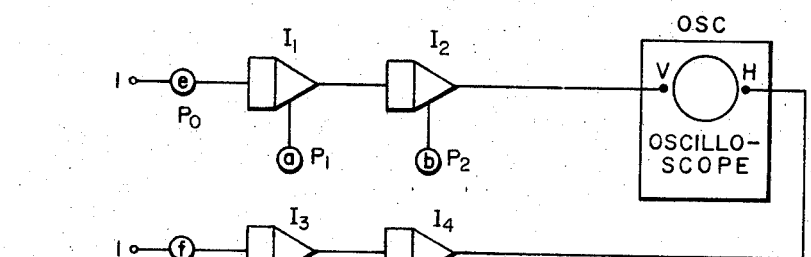
FIG. 2
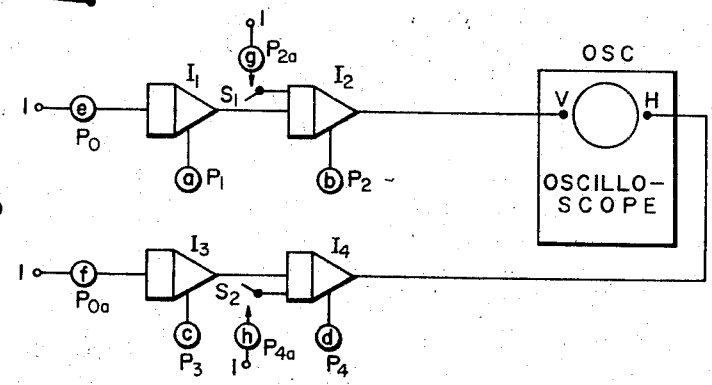
FIG. 1
FIG. 3
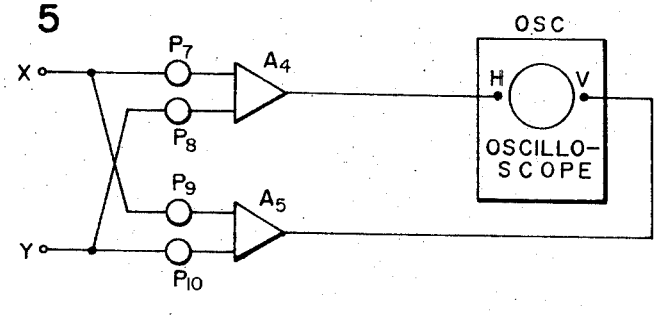
FIG. 5
FIG. 4
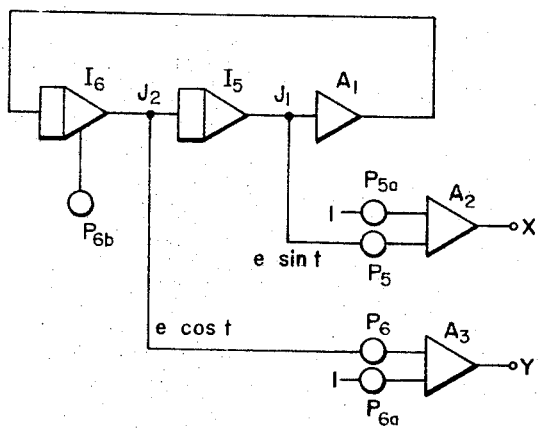
INVENTORS: TAKEO MIURA
JUNZO IWATA
JUNJI TSUDA
BY: Paul M. Craig, Jr.
ATTORNEY

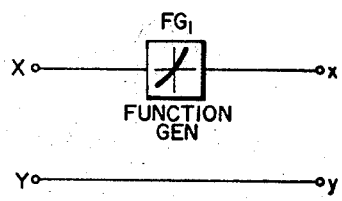
FIG. 6
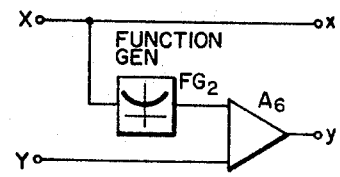
FIG. 7
FIG. 8
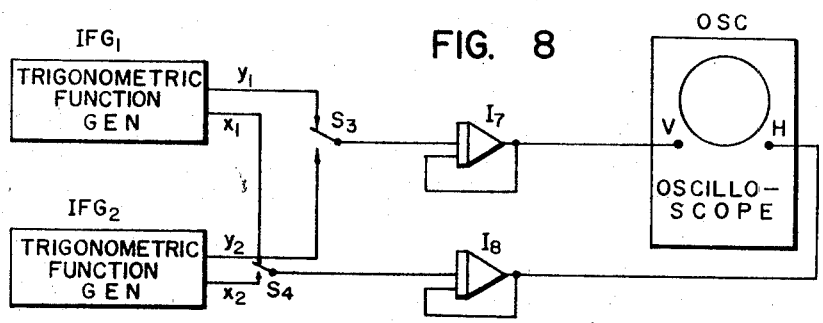
FIG. 9a
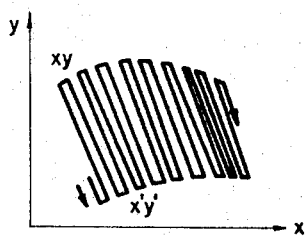
FIG. 9b
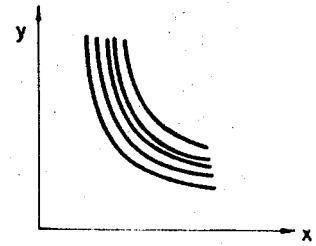
FIG. 10a
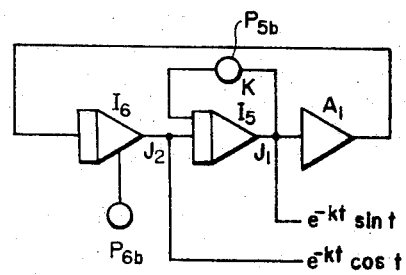

FIG. 10b
FIG. 11
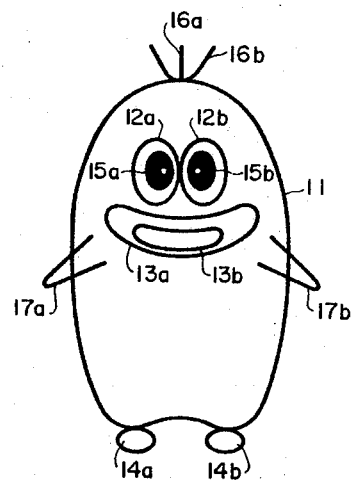
FIG. 16
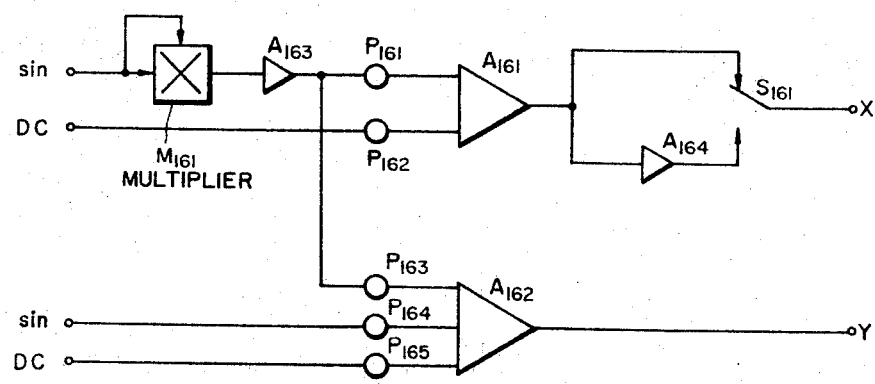
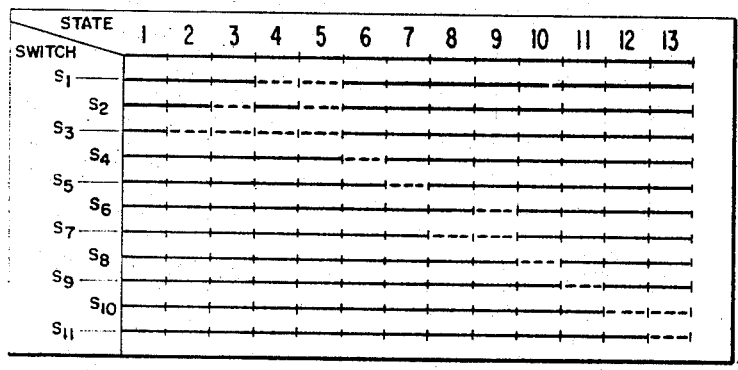
FIG. 17
INVENTORS: TAKEO MIURA
JUNZO IWATA
JUNJI TSUDA
BY Paul M. Craig, Jr.
ATTORNEY

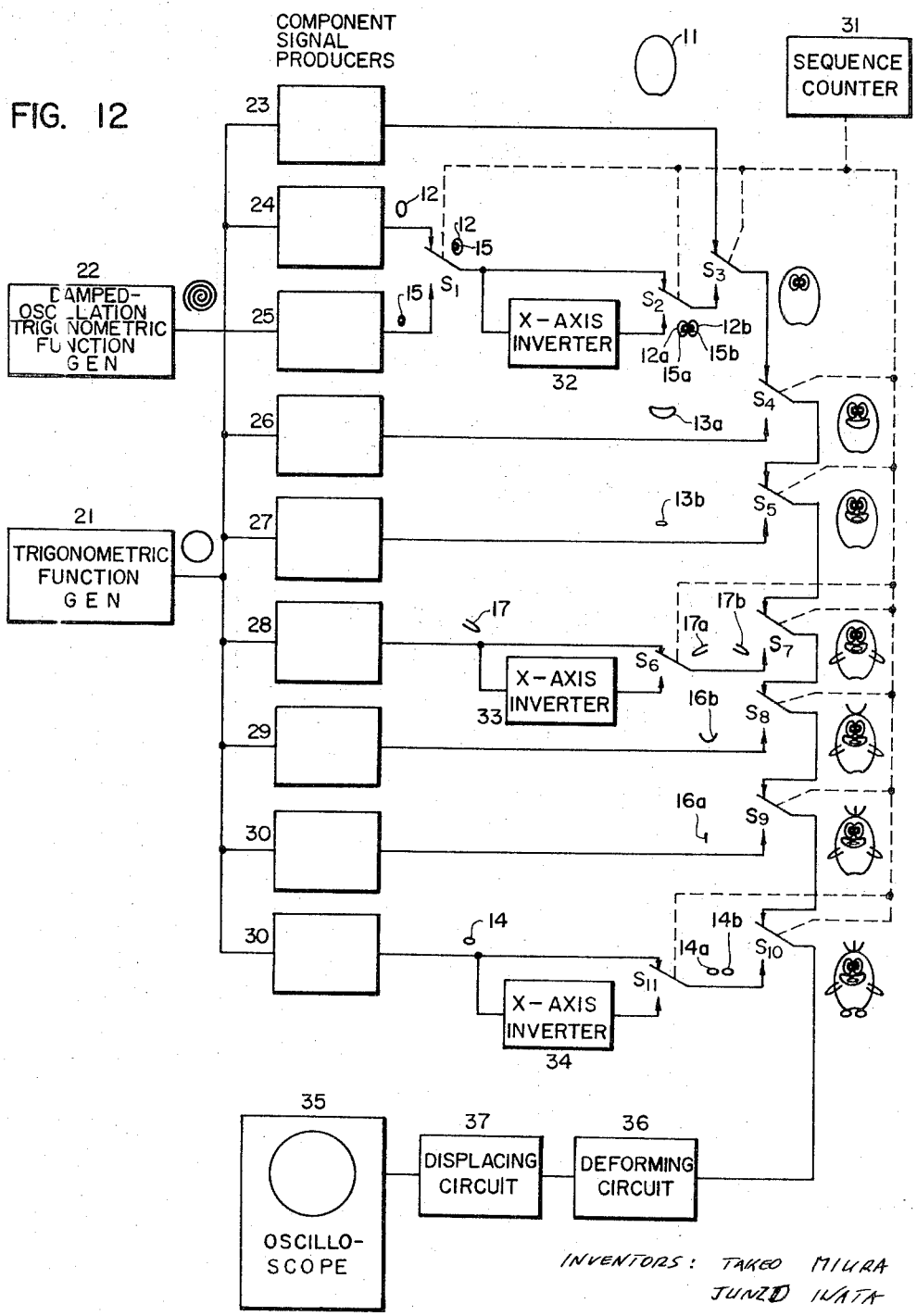

United States Patent Office 3,544,833
Patented Dec. 1, 1970

3,544,833
ANIMATABLE PICTURE-IMAGE REPRESENTING SYSTEM
Takeo Miura, 20–4 5-chome, Honda, Kokubunji-shi, Japan; Junzo Iwata, 201 Meguridacho, Kodaira-shi, Japan; and Junji Tsuda, 344 1 cho, Nakano, Hachioji-shi, Japan
Filed June 22, 1967, Ser. No. 648,100
Claims priority, application Japan, June 22, 1966, 41/40,078
Int. Cl. H01j 29/70
U.S. Cl. 315—18    6 Claims

ABSTRACT OF THE DISCLOSURE

An animatable picture-image representing system for developing a number of component signals, each indicating partial components of an original figure to be represented. The component signals are prepared by analogical operational circuits, and are combined time-sequentially under the control of a suitable sequence counter to form a picture-image on an oscilloscope. The animation of the picture-image on the oscilloscope observing screen is carried out by means for deforming the component signals optionally and for deforming and displacing the composite picture image.

---

This invention relates to an animatable picture-image representing system, and more particularly to a system for electrically representing animatable picture-images on a screen of an oscilloscope, for example.

In the field of caricature movies and the like, it has heretofore been required to manually draw numerous original figures which are slightly different from each other, and thereafter to picture the figures on a movie film time-sequentially. This method, particularly the drawing of numerous original figures is not avoidable and requires enormous labor, time and expense.

Accordingly, the general object of the present invention is to propose a new system for generating electric signals that are used to electro-optically represent animatable picture-images, and by means of which it is possible to remarkably reduce the labor, time and expense for drawing the numerous original figures.

Another object of the present invention is to provide a new animatable picture-image representing system, according to which it is possible to optionally animate an original picture-image into different appearances or positions by electrical means.

Still another object of the present invention is to provide an animatable picture-image representing system using analogical operation circuits.

A further object of the present invention is to provide an animatable picture-image representing system which is adaptable for preparing animatable movie pictures, visible images for education, figures for advertisement and simulated images for training simulators.

According to the present invention, a plurality of component signals, each indicating partial components of an original figure to be represented are produced by analogical operation circuits and the like. These component signals are time-sequentially combined to drive the observing screen of an image-representing apparatus. The animation of the picture-image on the observing screen of the image-representing apparatus is carried out by means for deforming the component signals optionally and for deforming and displacing the composite combined picture-image.

These and other objects and advantages of the present invention will become more apparent from the following description when taken in connection with the accompanying drawings, in which:

FIG. 1 is a diagram showing a curved line used for explaining one principle employed in the present invention;

FIG. 2 is a schematic circuit arrangement for producing a picture-image of the curved line such as shown in FIG. 1 on the screen of an oscilloscope;

FIG. 3 is a schematic circuit arrangement showing a modification of FIG. 2;

FIG. 4 is a schematic circuit arrangement showing a trigonometric function generator used in the present invention;

FIG. 5 shows a schematic circuit arrangement for modifying the circuit of FIG. 4 in order to produce rotation of the picture-image on the screen;

FIGS. 6 and 7 show two different circuit arrangements for making partial enlargement or shortening a picture-image on a screen;

FIG. 8 shows a schematic circuit arrangement for producing a limited-zone image having a substantial uniform brightness;

FIGS. 9a and 9b are graphical diagrams showing two different picture-images obtained by the circuit arrangement of FIG. 8;

FIG. 10a is a schematic circuit arrangement showing a damped oscillation trigonometric function generator which is a modification of the circuit of FIG. 4;

FIG. 10b is a graphical diagram showing the picture-image obtained by the circuit of FIG. 10a;

FIG. 11 shows one example of an original figure of a caricature image to be represented by a system according to the present invention;

FIG. 12 is a functional block diagram of an animatable picture-image representing system comprising one embodiment of the present invention;

Figure 13:
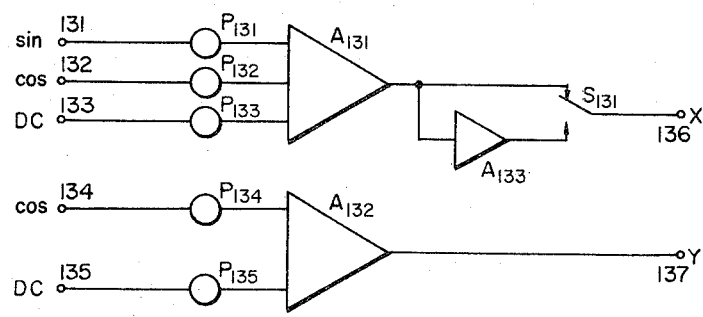

FIGS. 13 to 16 inclusive are schematic circuit arrangements showing the details of the component signal producers included in the system of FIG. 12; and FIG. 17 is a timing diagram showing one cycle of operation of the time sequential switching device or sequence counter comprising a part of the animatable system shown in FIG. 12.

FIGS. 1 to 10 illustrate various types of fundamental circuit arrangements which are used in building an animatable picture-image reproducing system according to the present invention, and further illustrate certain basic principles by means of which the present invention operates. In the following description, these fundamental circuits will be first explained. Subsequently, a complete animatable system incorporating the fundamental circuit arrangements and its manner of operation will be described.

In general, a picture-image can be considered to be an aggregation of a number of individual line-elements, which can be classified as follows:

(1) Smooth and continuous curves, each having beginning and ending points, and
(2) Smooth and closed curves, each composed, for example, of a circle, ellipse, etc.

Curves which have one or more folded points or sharp discontinuities thereon can be classified into either group (1) to (2), since such folded points can be considered to be the beginning or ending points of partial curves which form the components of the resultant curve.

One example of a curve classified into group (1) is shown in FIG. 1. Since this curve can be divided into three partial curves AB, BC and CD in this case, it is possible to approximate such partial curves to suitable parabolic curves, by analogical methods. FIG. 2 illustrates one example of a circuit arrangement for implementing such an analogical method. In this figure; references $P_0$, $P_{0a}$, $P_1$, $P_2$, $P_3$ and $P_4$ indicate potentiometers; references $I_1$, $I_2$, $I_3$ and $I_4$, integrators; and reference OSC, a cathode-ray oscilloscope for representation of the picture-image of the curve. The potentiometers, integrators and cathode-ray oscilloscope all are conventional, commercially available circuit components and need not be described in detail. The initial values (b) and (d) of the respective integrators $I_2$ and $I_4$, which are given by the potentiometers $P_2$ and $P_4$, and determine the coordinates of the beginning point A on the curve shown in FIG. 1. The initial values (a) and (c) of the respective integrators $I_1$ and $I_3$ are given by the potentiometers $P_1$ and $P_3$, and the ratio $m_1$ of such initial values (a) and (c) determines the inclination value of the curve at the beginning point A thereof. The output signal of the integrator $I_2$ is introduced to a vertical-axis terminal V of the oscilloscope OSC, and the output signal of the integrator $I_4$, to a horizontal-axis terminal H. When the suitable values of input signals (e) and (f) for the integrators $I_1$ and $I_3$ are given by the potentiometers $P_0$ and $P_{0a}$, it is possible to satisfy such conditions that the parabolic line on the screen of the oscilloscope OSC passes through the point B, and that the tangential line of such parabolic line coincides with that of the partial curve AB at the point B thereof.

The input-signal values (e) and (f) can be determined beforehand by a suitable calculation step; however, these values can be also determined by a logical operation circuit for obtaining the roots of the following algebraic functions:

$$y_2 = \frac{1}{2} e t^2 + at + b,$$

and
$$x_2 = \frac{1}{2} f t^2 + ct + d,$$

$$m_2 = \frac{a + et}{c + ft};$$

where: $x_2$ and $y_2$ indicate the coordinates of the point B; $m_2$, the inclination value of the curve at the point B; and $t$, time, respectively.

After the partial curve AB has been completely represented, the input signal values (e) and (f) are switched to different values determined by expression (1) for point C. In this case, since the output signals of the integrators $I_1$ and $I_3$ are maintained at certain values, the output signals of the integrators $I_2$ and $I_4$ can be also maintained so as to continue smoothly through points B and C to D. Consequently, the inclination of the tangential lines on the curve represented by the circuit arrangement shown in FIG. 2 is caused to be continuous. By repeating such an operation as mentioned above at points B and C, it is possible to represent the whole desired curve, such as a curve AD shown in FIG. 1, on the screen of the oscilloscope OSC.

FIG. 3 illustrates a circuit arrangement for representing a curve having a folded point or sharp discontinuity. In this figure, the references used in FIG. 2 indicate similar parts. In this arrangement, additional input signals (g) and (h) which are produced in potentiometers $P_{2a}$ and $P_{4a}$, are introduced to the integrators $I_2$ and $I_4$ through switching elements $S_1$ and $S_2$, respectively. According to this arrangement, the new inclination value at the folded point of the curve to be represented is given by the ratio of a value obtained by adding the aditional input signal (g) to the output signal of the integrator $I_1$, to a value obtained by adding the additional input signal (h) to the output signal of the integrator $I_3$.

When the input signals (e) and (f) for the integrators $I_1$ and $I_3$ in FIG. 2 are maintained at zero value so as to set these integrators under the limited condition of the parabolic line, a straight line is represented on the screen of the oscilloscope. When all the integrators are reset at new initial values corresponding to a new beginning point and a new inclination value, it is possible to represent an independent curve having a new beginning point.

FIG. 4 illustrates one example of a trigonometric function generation circuit arrangement adapted for representation of curves of the type classified into group (2). Since such curves can be considered to be a deformed circle, it is desirable to use a trigonometric function generation circuit as shown in FIG. 4. In this figure; references $I_5$ and $I_6$ indicate integrators; reference $A_1$ indicates an amplifier or inverter which serves to amplify and invert one output of integrator $I_5$; $A_2$ and $A_3$ represent adders of conventional construction; and $P_5$, $P_{5a}$, $P_6$, $P_{6a}$ and $P_{6b}$ potentiometers, respectively. The output signal from the integrator $I_6$ is introduced to the integrator $I_5$, where such signal is integrated. The output signal from the integrator $I_5$ is inverted by the inverter $A_1$ and then is fed back to the input of integrator $I_6$. When the potentiometer $P_{6b}$ is set at an adequate value, sine and cosine waves can be taken out from the junction points $J_1$ and $J_2$, and these waves are introduced to terminals X and Y through the adders $A_2$ and $A_3$. The signals from the terminal X and Y are used for driving the horizontal and vertical axes of the oscilloscope (not shown), respectively. When the multiplying factors of the respective potentiometers $P_5$ and $P_6$ are set suitable values, a circular picture-image is represented on the screen of the oscilloscope. When these multiplying factors are simultaneously changed with equal variation rates, the diameter of the circular picture-image on the screen is caused to be enlarged or shortened. Moreover, when the multiplying factor of one of the potentiometers $P_5$ and $P_6$ is changed, the circular picture-image can be deformed in one direction, for example, the horizontal direction. Consequently, it is possible to represent variable kinds of picture-images consisting of a closed curve, by adequately setting the multiplying factors of the respective potentiometers $P_5$ and $P_6$. Furthermore, it is possible to make parallel displacement of the picture-image by changing the multiplying factors of the potentiometers $P_{5a}$ and $P_{6a}$.

FIG. 5 illustrates a circuit arrangement for causing rotation of the picture-image on the screen of the oscilloscope. In this figure, input terminals X and Y are to be connected with the terminals X and Y in FIG. 4, respectively. References $A_4$ and $A_5$ indicate adders, and references $P_7$, $P_8$, $P_9$ and $P_{10}$, potentiometers, respectively. As is apparent from the figure, each of the adders $A_4$ and $A_5$ serves to add the input signals X and Y to each other. When the multiplying factors of the respective potentiometers $P_7$, $P_8$, $P_9$ and $P_{10}$ are set adequately, the picture-image on the screen is caused to rotate through a desired angle.

An unclosed curve (including a straight line) can be considered to be an extremely deformed ellipse, the minor axis of which is zero. Accordingly, in cooperation with or without such circuit arrangement as shown in FIG. 5, the circuit arrangement shown in FIG. 4 can also be used for representation of unclosed curves, as a substitution for the circuit arrangement shown in FIG. 2.

FIG. 6 illustrates a circuit arrangement for making partial enlargement or shortening of the picture-image on the screen. In this case, one of the functional signals X and Y (sine and cosine waves) is passed through a suitable function generator $FG_1$. The function generator FG may be of any known type for modifying a signal input thereto in accordance with a desired function. When the signal X is processed by the function generator $FG_1$, as shown in FIG. 6, the picture-image on the screen can be deformed in accordance with the desired function while keeping the symmetry in the vertical direction. On the other hand, when the signal Y is processed by the function generator, (not shown), the picture image on the screen can be deformed while keeping the symmetry in the horizontal direction.

FIG. 7 illustrates a modification of the circuit arrangement shown in FIG. 6. In this case, a part of the signal X (sine or cosine wave) is introduced through a function generator $FG_2$ to an adder $A_6$, wherein the modified signal X is added to the signal Y. By such operation the picture-image on the screen can be deformed at a desired point on the Y-axis thereof. Similarly, by supplying the signal Y through a function generator such as $FG_2$ to the X signal in a mirror arrangement of FIG. 7, desired deformation at a point on the X-axis can be obtained.

In some cases, it is desirable to represent a limited-zone image having a substantially uniform brightness. FIG. 8 illustrates a circuit arrangement for such purpose. This arrangement is provided with two trigonometric function generators $IFG_1$ and $IFG_2$ each of which comprise the same structure as that of FIG. 4. Output signals $y_1$ and $y_2$ of both generators are introduced to an integrator $I_7$ through a switching element $S_3$, and the output signals $x_1$ and $x_2$ are introduced to an integrator $I_8$ through a switching element $S_4$. When the switching elements $S_3$ and $S_4$ are caused to switch with a predetermined period, the initial values of the integrators $I_7$ and $I_8$ are changed periodically. Accordingly, it is possible to represent a limited-zone image having a substantially uniform brightness, as shown in FIGS. 9a and 9b for example. Since the spaces between the respective scanning lines can be varied by adjusting the switching speed of the switching elements $S_3$ and $S_4$, the image brightness on the screen of the oscilloscope can be changed optionally.

FIG. 10a illustrates a circuit arrangement for producing an effect similar to that of FIG. 8. This arrangement has a similar circuit structure to that of FIG. 4, except that the integrator $I_5$ includes a feed-back circuit. A potentiometer $P_{5b}$ inserted into the feedback circuit is used for a damping element for the integrator $I_5$. By using such damping element (potentiometer $P_{5b}$), it becomes possible to represent a whirlpool image on the screen of the oscilloscope, such image being shown in FIG. 10b, for an example. When the damping constant K of the damping element of the integrator $I_5$ is selected adequately by setting of the potentiometer $P_{5b}$, a dislike image having a substantial brightness over the whole surface thereof can be obtained. If the operation of the circuit is suspended before the inside diameter of the image reaches zero, a ringlike image having a suitable width, can be obtained.

It is possible to represent a required picture-image on the screen of the oscilloscope by suitably combining the above-mentioned various analogical operation circuits. FIG. 11 shows one example of original figure or caricature image to be represented by the present invention. This caricature image is composed of seven closed curves, two rings and five second-degree curves. The closed curve 11 indicates a body of the objective figure; the curves 12a and 12b, eyes; the curves 13a and 13b, a mouth; the curves 14a and 14b, feet; the rings 15a and 15b, eyeballs; the second-degree curves 16a and 16b, three threads of hair; and the second-degree curves 17a and 17b, arms, respectively. According to the present invention, a plurality of component signals, each of which indicates the partial features of the figure shown in FIG. 11, are produced by the circuit shown in FIG. 12 which is a schematic diagram of one embodiment of a system according to the present invention.

The arrangement shown in FIG. 12 is provided with a trigonometric function generator 21 and a damped-oscillation trigonometric function generator 22. The generator 21 is composed of a function generator circuit as shown in FIG. 4, and the generator 22 is composed of a circuit as shown in FIG. 10a. The output of the generator 21 is commonly supplied to a plurality of component signal producers 23, 24 and 26 through 31 to be described more fully hereinafter. The output of the generator 22 is supplied to a component signal producer 25. The details of these component signal producers 23 through 31 will be hereinafter explained in connection with FIGS. 13 through 16.

The first component signal producer 23 produces a component signal indicating the body 11 of the objective figure in FIG. 11; the second producer 24, an original component signal of the two component signals (one of which is an inverted version of the original component signal) indicating the eyes 12a and 12b; the third producer 25, an original signal of the component signals indicating the eyeballs 15a and 15b; the fourth and fifth producers 26 and 27, component signals indicating the curves 13a and 13b of the mouth; the sixth producer 28, an original signal of the component signals indicating the arms 17a and 17b; the seventh and eighth producers 29 and 30, component signals indicating the hair 16a and 16b; and finally, the last producer 31, an original signal of the component signals indicating the feet 14a and 14b, respectively. Indicated with references $S_1$ to $S_{11}$ inclusive are switching elements which are controlled by a sequence counter 32.

The output signals 12 and 15 from the component signal producers 24 and 25 are time-sequentially combined with each other by the switching element $S_1$. In FIG. 12, the combined partial picture-image indicated by the references 12 and 15 is represented in the form of a combined figure for simplification of explanation. However, it should be understood in practice that both signals 12 and 15 are arranged time sequentially and are not thus combined except in appearance on the face of the oscilloscope 38. The other combined figures represented at various positions in FIG. 12 should be also understood in the same manner.

A part of the combined signals 12 and 15 is introduced to the switching element $S_2$ directly, and the remainder thereof is introduced to an inverter circuit 33. The coordinate of the combined signals on the X-axis (i.e. the horizontal axis on the screen of the oscilloscope) is inverted into the opposite sign, and thereafter such inverted signals are introduced to the switching element $S_2$. The switching element $S_2$ serves to time-sequentially combine the signals from the switching element $S_1$ and the inverter 33 with each other under the control of the sequence counter 32, and then component signals 12a, 12b, 15a and 15b indicating the eyes and eyeballs of the objective figure can be obtained.

In the meantime, a part of the output signal 17 from the producer 28 is introduced to the switching element $S_6$ directly, and the remainder thereof is introduced to an inverter circuit 34, wherein the coordinate thereof on the X-axis is inverted into the opposite sign. Consequently, the signals 17a and 17b indicating the arms of the objective figure are obtained from the switching element $S_6$ under the control of the sequence counter 32. Similarly, the signals 14a and 14b indicating the feet of the objective figure can be obtained from the switching element $S_{11}$ under the cooperation of an inverter 35 and the sequence counter 32.

Accordingly, all the component signals 11, 12a, 12b, 13a, 13b, 14a, 14b, 15a, 15b, 16a, 16b, 17a, 17b are introduced to the switching elements $S_3$, $S_4$, $S_5$, $S_7$, $S_8$, $S_9$ and $S_{10}$, respectively. When the repeating cycle of both the function generators 21 and 22 is selected at the clock cycle (or a multiple thereof) of the sequence counter 32, all of the output signals of the component signal producers 23 to 31 inclusive are caused to simultaneously and repeatedly develop in synchronism with the clock of the sequence counter 32.

FIG. 17 is a timing diagram showing the operation of the switching elements $S_1$ to $S_{11}$ by the sequence counter 32. The switching elements $S_1$ to $S_{11}$ may comprise, for example, a cross-bar switch the elements of which are set closed or open by suitable excitation signals supplied from sequence counter 32.

In FIG. 17, solid lines indicate that the switches are set at the upper side (state 1) thereof, and dotted lines indicate that the switches are set at the lower side (state 2) thereof.

During the first repeating cycle of the sequence counter 32 and generators 21 and 22, all the switching elements $S_1$ to $S_{11}$ inclusive are set at the upper side (state 1) thereof as shown in FIG. 17. Consequently, the component signal 11 indicating the body of the objective figure is introduced from the producer 23 to the oscilloscope 38 through a deforming circuit 36 and displacing circuit 37, and the partial image indicating the body 11 is represented on the screen of the oscilloscope 38.

During the second cycle, only the switching element $S_3$ is reset at the lower side (state 2) thereof, as shown in FIG. 17 and then the signal 12a indicating the right eye is introduced to the oscilloscope 38. During the third cycle, the switching elements $S_2$ and $S_3$ are set at the lower side (state 2) thereof, as shown in FIG. 17. In this case the signal 12b indicating the left eye is introduced to the oscilloscope 38. During the fourth cycle, the switching elements $S_1$ and $S_3$ are set at the lower side (state 2) thereof, as shown in FIG. 17 and then the signal 15a indicating the eyeball of the right eye is introduced to the oscilloscope 38. During the fifth cycle, the switching elements $S_1$, $S_2$ and $S_3$ are set at the lower side (state 2) thereof, as shown in FIG. 17 and then the signal 15b indicating the eyeball of the left eye is introduced to the oscilloscope 38.

During the next cycle, only the switching element $S_4$ is set at the lower side (state 2) thereof, as shown in FIG. 17 and during the seventh cycle, only the switching element $S_5$ is set at the lower side (state 2) thereof, as shown in FIG. 17. Consequently, the component signals 13a and 13b are time-sequentially introduced to the oscilloscope 38.

Similar time sequential switching operations are continued until the component signal 14b indicating the left foot of the objective figure is introduced to the oscillator 38. It therefore becomes possible to represent the objective figure on the screen of the oscilloscope 38 by cyclically repeating the sequential switching operations described above. The deformation or displacement of the whole picture-image on the screen can be carried out by the circuits 36 and 37. In FIG. 12, shifters can also be used instead of the 5-axis inverters 33 and 35 in order to make similar images.

The component signal producer 23 for the body of the objective figure is composed of a circuit arrangement such as shown in FIG. 7. The component signal producers 24 and 25 are composed of the circuit arrangement shown in FIG. 13. In this figure, a terminal 131 is connected with the junction point $J_1$ of the generator shown in FIG. 4 or 10; terminals 132 and 134 are connected with the junction point $J_2$ of such generator; and terminals 133 and 135 are connected with a suitable direct current source (not shown) respectively. An X-axis signal is taken out from a terminal 136, and a Y-axis signal, from a terminal 137. Indicated by references $A_{131}$ and $A_{132}$ are adders, and a reference $A_{133}$, an inverter. References $P_{131}$, $P_{132}$, $P_{133}$, $P_{134}$ and $P_{135}$ indicate potentiometers, and a reference $S_{131}$, a switching element corresponding to the switching element $S_2$ in FIG. 12. (The switching element $S_1$ in FIG. 12 is omitted for simplification.) The size of the partial picture image in the X-axis direction can be adjusted by using the potentiometer $P_{131}$, and the size in the Y-axis direction can be adjusted by using the potentiometer $P_{134}$. The position of the picture-image on the X-axis or Y-axis can be adjusted by using the potentiometer $P_{133}$ or $P_{135}$. The inclination of the image can be adjusted by using the potentiometer $P_{132}$. The output signals from the potentiometers $P_{131}$, $P_{132}$ and $P_{133}$ are introduced to the adder $A_{131}$ where these signals are added to each other. A part of the output signal from the adder $A_{131}$ is directly introduced to an upper contact of the switching element $S_{131}$, and the remainder is introduced to a lower contact of the element $S_{131}$ through an inverter $A_{133}$. The output signals from the potentiometers $P_{134}$ and $P_{135}$ are introduced to the adder $A_{132}$, wherein those are added to each other and the output signal from the adder $A_{132}$ is introduced to the terminal 137.

According to this circuit arrangement, it is possible to produce the component signals indicating the eyes 12a and 12b and the eyeballs 15a and 15b of the objective figure shown in FIG. 11. By adjusting the respective potentiometers $P_{131}$, $P_{132}$, $P_{133}$, $P_{134}$ and $P_{135}$, the picture-images representing such eyes and eyeballs can be optionally deformed, and the positions thereof can be also optionally displaced.

Figure 14:
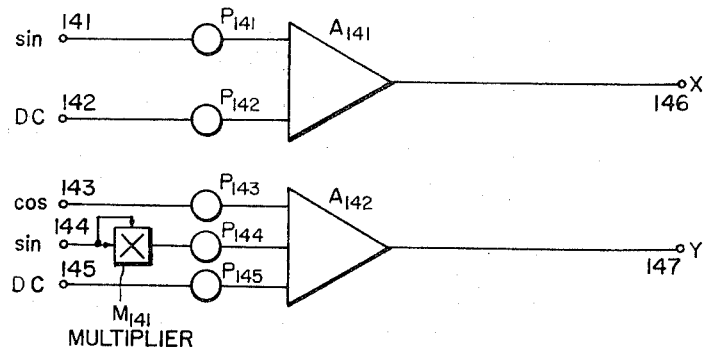

FIG. 14 illustrates the details of the component signal producers 26 and 27 for producing the signals 13a and 13b in FIG. 12. In FIG. 14, the connections of respective terminals 141 through 145 with the trigonometric function generator shown in FIG. 4 and with the direct-current source will be understood by referring to marks "sin," "cos" and "DC" attached to the respective terminals. References P and A accompanied with a suffix indicate potentiometers and adders, respectively.

The size of the mouth of the picture-image on the screen of the oscilloscope can be varied by adjusting the potentiometers $P_{141}$ and $P_{143}$, and the position of the mouth can be displaced by adjusting the potentiometers $P_{142}$ and $P_{145}$. In this circuit arrangement, a part of the sine wave from the trigonometric function generator is introduced to the potentiometer $P_{144}$ through a multiplier circuit $M_{141}$ of conventional construction for obtaining a square of the sine-function. Accordingly, it becomes possible to finely vary the facial expression of the objective figure by adjusting the potentiometer $P_{144}$.

Figure 15:
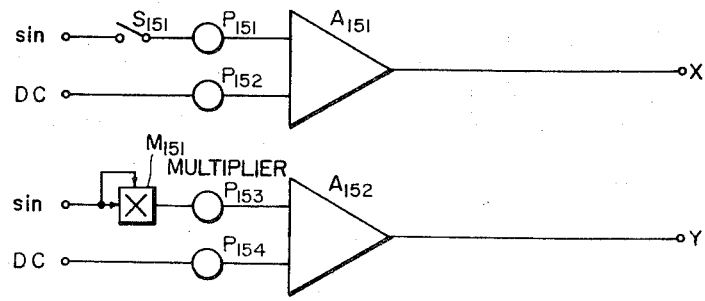

FIG. 15 illustrates the details of the component signal producers 29 and 30 for producing the signals 16a and 16b indicating the hair of the objective figure. In case of producing the signal 16a indicating the central thread of hair, a switching element $S_{151}$ is cut off. A multiplier $M_{151}$ is used for producing the second-degree function signal. Potentiometers $P_{151}$ and $P_{153}$ are used for varying the size of the picture-image along the X-axis and Y-axis, respectively, and potentiometers $P_{152}$ and $P_{154}$, for displacing the position of the picture-image.

FIG. 16 illustrates the details of the component signal producer 28 for producing the signals 17a and 17b in FIG. 12. A multiplier $M_{161}$ is used for producing the second degree function signal. Potentiometers $P_{161}$ and $P_{164}$ are used for varying the size of the picture-image along the X-axis and Y-axis, and potentiometers $P_{162}$ and $P_{165}$, for displacing the position of the picture image. Indicated by references $A_{163}$ and $A_{164}$ are inverters, and reference $S_{161}$, a switching element corresponding to the switching element $S_6$ in FIG. 12. In this circuit, a part of the output of the inverter $A_{163}$ is introduced to the potentiometer $P_{163}$, whereby the swinging motion of the arms can be controlled.

Though the details of the component signal producer 31 for producing the signals 14a and 14b indicating the feet of the objective figure have been omitted, it will be apparent that such signals can be easily obtained by using a circuit such as that shown in FIG. 4.

The time period of one repeating cycle of the trigonometric function generators used in the embodiment of FIG. 12 is mainly determined by the time-constant of the integrators included in such generators, and it is possible to set up such time period at about 300 microseconds. Thus, even if the objective figure is composed of 100 partial curves or lines, the required time to finish one complete image trace of the objective figure shown in FIG. 11 on the screen of the oscilloscope is only 30 milliseconds. Consequently, it is possible to represent a stable picture consisting of about 33 frames per second by repeating the same operation every 30 milliseconds.

The deformation and displacement of one part of the picture-image on the screen can be carried out by optionally adjusting the potentiometers included in the respective component signal producers 23 to 31 inclusive in FIG. 12. On the other hand the deformation and displacement of the whole picture-image can be carried out by optionally adjusting the deforming circuit 36 and displacing circuit 37. Though the details of such circuits 36 and 37 are omitted, the construction of such circuits will be apparent to a person skilled in the art when referring to the above-mentioned description.

The deformation and displacement of the picture-image can be carried out manually. However, it is also possible to carry out such adjustment under a predetermined program by using a suitable data processing system, such as digital computer, hybrid computer and the like.

For the purpose of moving all parts of the picture-image on the screen, it is required to use a very complicated program. However, if the following points are considered, such program can be simplified without requiring high-speed logical operations or conversions:

(1) In general cases, only limited portions of the picture-image are required to be animated;

(2) The whole picture-image can be animated by using a suitable technique such as parallel displacement, rotation, conversion in coordinates and the like;

(3) When a change of constants is given by a simple equation with respect to time, the logical operation of such constants can be carried out by an analogue computer having a relatively large time-constant in comparison with that of the logical operation circuits for representing the picture-image, and the obtained constants can be indicated by a digital computer;

(4) In case of representing caricature images, the number of partial curves and lines forming such image is relatively small; and (5) A certain time-loss may be permitted for completion of the picture-image.

While we have shown and described only one embodiment of the present invention, it will be understood that the same is not limited thereto but is susceptible of numerous changes and modifications as will be apparent to a person skilled in the art. Therefore, we do not wish to be limited to the details shown and described herein but intend to cover such modifications and changes as defined by the appended claims.

We claim:

1. An animatable picture-image representing system comprising means for producing a plurality of component electrical signals each indicating partial components of an original figure to be represented, combining means coupled to the output of said component signal producing means for combining the plurality of component signals, and electro-optical means coupled to the output of the combining means for representing a picture-image corresponding to the original figure in accordance with the combined component signals, wherein the combining means is a time sequentially operated combining means and composite picture-image presentation is achieved due to the integrating effect of the electro-optical means, said compenent signal producing means comprising at least one trigonometric function generator and a plurality of analogical operation circuits for producing the respective component signals for modifying the trigonometric function signal from said generator, at least one of said trigonometric function generators being a damped oscillation trigonometric generator.

2. An animatable picture image representing system according to claim 1 wherein each of said analogical operation circuits comprises adding circuit means, means for supplying the X-Y coordinate signals from said trigonometric function generator to the adding circuit means as an input thereto, and potentiometric signal generating means coupled to the input of the adding circuit means for modifying the output component signal in a desired manner.

3. An animatable picture-image representing system according to claim 2 in which said analogical operation circuits include potentiometric signal generating means for displacing the position and varying the sizes of the partial components of the picture-image.

4. An animatable picture-image representing system according to claim 3 further including deforming means coupled intermediate the combining means and the electro-optical means for deforming the whole picture-image.

5. An animatable picture-image representing system according to claim 4 further including means coupled intermediate the combining means and the electro-optical means for displacing the whole picture image.

6. An animatable picture-image representing system according to claim 5 and further including means coupled to the output of the component signal producing means for reproducing and inverting the position of selected partial components.

References Cited

UNITED STATES PATENTS

| | | | |
|---|---|---|---|
| 3,364,382 | 1/1968 | Harrison | 315—18 |
| 3,422,419 | 1/1969 | Mathews | 315—18X |
| 3,426,344 | 2/1969 | Clark | 315—18X |
| 3,440,639 | 4/1969 | Sander | 315—18X |

RODNEY D. BENNETT, Primary Examiner

J. D. BAXTER, Assistant Examiner

U.S. Cl. X.R.

340—324.1